Figure 1:
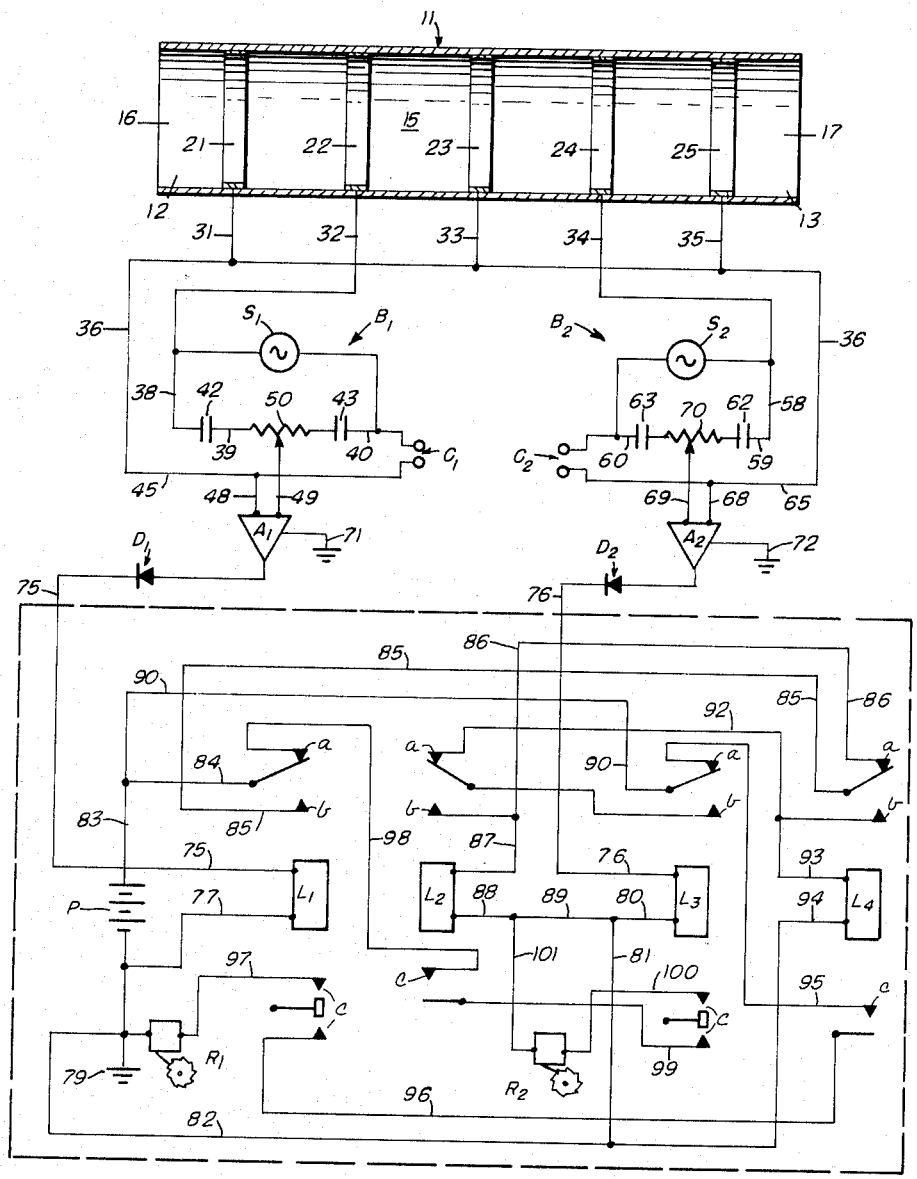

Dec. 14, 1965

G. M. LUCICH ETAL 3,223,319

MULTIPLE ELECTRODE DETECTOR

Filed Nov. 18, 1964

2 Sheets-Sheet 1

INVENTORS
GEORGE M. LUCICH
JULIUS ROCKWELL, JR.
ROBERT E. BERGSTROM

BY Ernest S. Cohen
Gerster Sadowsky
ATTORNEYS

Dec. 14, 1965

G. M. LUCICH ETAL 3,223,319

MULTIPLE ELECTRODE DETECTOR

Filed Nov. 18, 1964

2 Sheets-Sheet 2

INVENTORS
GEORGE M. LUCICH
JULIUS ROCKWELL, JR.
ROBERT E. BERGSTROM

BY Ernest S. Cohen

Gersten Sadowsky
ATTORNEYS

United States Patent Office 3,223,319
Patented Dec. 14, 1965

3,223,319
MULTIPLE ELECTRODE DETECTOR
George M. Lucich and Julius Rockwell, Jr., Washington, D.C., and Robert E. Bergstrom, Seattle, Wash., assignors to the United States of America as represented by the Secretary of the Interior
Filed Nov. 18, 1964, Ser. No. 412,269
4 Claims. (Cl. 235—98)
(Granted under Title 35, U.S. Code (1952), sec. 266)

The invention herein described and claimed may be manufactured and used by or for the Government of the United States of America for governmental purposes without the payment of royalties thereon or therefor.

The present invention concerns improvements in an electrical detector and indicator apparatus. More particularly, the improved apparatus operates to derive quantitative information relating to the passage of a substance through a medium confined within a component part of the apparatus by accomplishing a precise monitoring function upon the electrical conductivity of the substance in its association with the component part and an environment established therefor by the medium. Favoring the accomplishment of this cooperation in accordance with the present invention is the absence therein of any significant adversely disturbing effects which would ordinarily be imposed thereon by outside electrically conductive media in the vicinity of the component part. Of importance to enabling such cooperation is a specially designed passageway of the component part wherein three or more electrodes are uniquely arranged to be made operable when energized for controlling the activation of an electrical system which functions to derive and indicate relevant data upon the passage of the substance through the component part.

An apparatus according to the invention can be advantageously applied by having its passageway structure reside in a stream or other body of water where it is adapted to detect and indicate the presence of fish in the water which pass through the structure. As is more explicitly explained in the disclosure of Patent No. 2,893,633, issued to R. H. Van Haagen, on July 7, 1959, the utilization of fish detecting and indicating apparatus of the type disclosed herein, furnishes statistical information having importance to the management of fish hatcheries in providing an adequate census of stock, the testing of the adequacy of fish passing facilities, the management of sport fishing facilities in connection with data as to the abundance of stream fish at such facilities, as well as the operations of commercial fishermen in testing the efficiency of their traps. The hereinafter disclosed embodiment of the present invention utilizes for its passageway a tunnel structure in the same way as does Van Haagen, wherein such structure provides a restricted passageway for directing fish moving between adjacent bays in a stream, along a path which traverses a sequence of electrodes affixed to the inner surface of the tunnel structure. While Van Haagen's apparatus is generally satisfactory when applied under certain optimum conditions, the particular arrangement of electrodes disclosed in this patent for use in a restricted passageway, has limited applicability under many service conditions. The modifications which the disclosure of the present invention describes for the Van Haagen construction are singularly effective to overcome the limitations of the patented apparatus.

A further utility of the invention resides in its applicability for measuring the electrical conductivity of a fluid material moving through the passageway of its tunnel structure. Data produced by such measurements makes practical the monitoring of the conductivity of most flowing substances which in turn facilitates the making of a salinity profile of such a substance carried in any sort of conduit or pipe, or water carried along in a stream or an ocean current.

It is therefore an object of the present invention to provide for use in a fluid medium an improved detector in an electrical apparatus for controlling the operation of a system deriving and indicating electrical conductivity data.

A further object of the present invention is to provide for the control of a bi-directional registering system, an improved detector device which responds to variations in the electrical conductivity of media enclosed within the device.

Figure 2A:
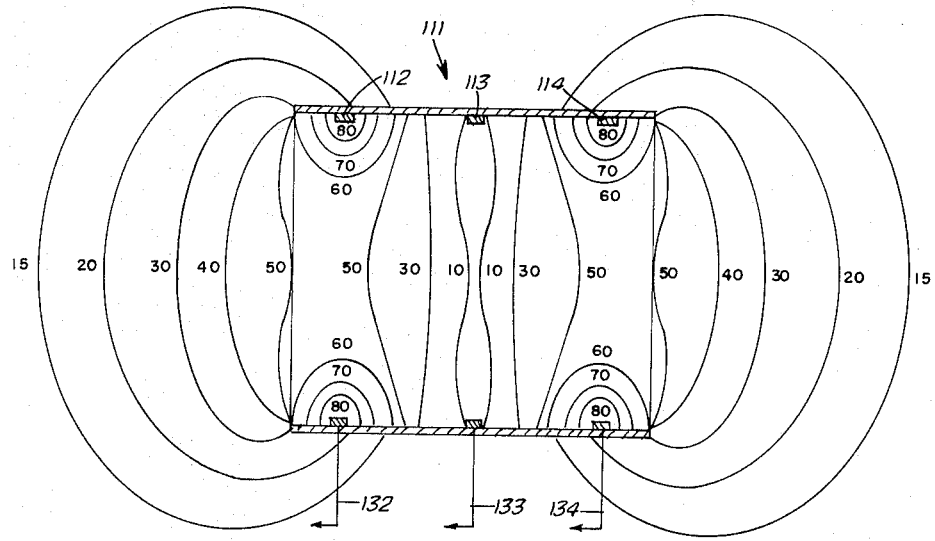
Figure 2B:
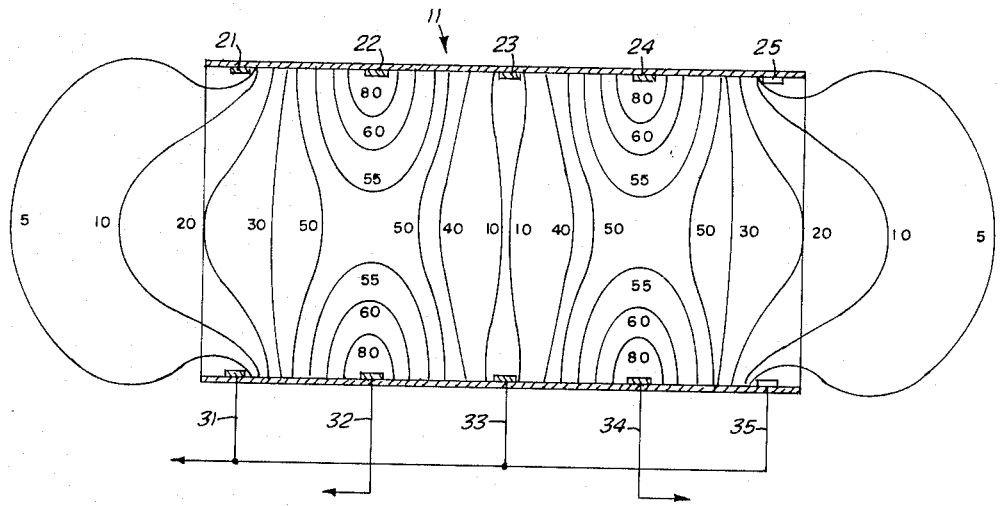

These and other objects and advantages of the invention will be more clearly understood from the following description of a preferred embodiment of the invention considered together with the accompanying drawing wherein:

FIG. 1 schematically illustrates the tunnel structure according to the invention, and diagrammatically shows circuitry which is responsive to activity in the tunnel structure for controlling further circuitry, also shown, which determines the operation of indicating registers comprising a registering system; and FIGS. 2a and 2b are diagrams of tunnel structures constructed according to the teachings of the prior art and the present invention, respectively, on which are graphically represented electrical phenomena occurring within these tunnel structures during their operation.

Tunnel structure 11 shown in FIG. 1 is essentially a tubular member 12, made of plastic or any other electrically non-conductive material suitable for use under water. Tubular member 12 has a uniform cross-section along its full length, which may be circular, square, rectangular or any variant of these forms as required by the exigencies of the particular application for which the tunnel structure is intended. Wall 13 comprising the tubular member, is made sufficiently thick to provide structural integrity therefor. Opposite openings 16 and 17 in the tubular member 12, which define between them a restrictive passage 15, are made sufficiently large to accommodate for normal entry and passage therethrough, one complete fish at a time. On occasions when a heavy run of fish may cause more than a single entry into passage 15 at any one time, a statistical correction factor based on a visual count can be determined and applied to suitably revise the registered count upwardly.

Affixed to the inner surface of tubular member 12, are five substantially identical electrodes 21 to 25, inclusive. These electrodes are appropriately spaced parallel to each other whereby they are enabled to cooperate amongst themselves to produce electrical phenomena which are hereinafter more fully explained. Each such electrode is actually a ribbon of conductive material which is secured by cement or the like to the inner wall of the tubular member whereby they conform to the particular shape of that wall. The hoops or rings fashioned in this manner, may also be supported in shallow recesses formed in the inner wall of the tubular member. Lead-in connections to the separate electrodes are provided by the individual conductive leads 31 to 35, inclusive, which are received through small bores in wall 13 opening on the electrode surfaces to which the leads are soldered. A further lead 36, connected in common to the electrode leads 31, 33 and 35, completes a circuit in which the electrodes 21, 23 and 25 can be maintained at the same potential. In practice lead 36 may be joined to extensions of the ground wire return provided by the shielding sheaths over the remaining electrode leads 32 and 34. In that case, only two cables need extend out of the water for each of the tunnel structures placed therein, since each such cable carries a connection for the common lead along with one of the leads directed to electrodes 22 and 24.

At the remote ends of the tunnel structure cables, the various leads therein are connected to a pair of impedance bridges $B_1$ and $B_2$. These bridges function in a conventional manner to compare potentials measurable across high resistance conductive paths between particular pairs of electrodes 21 to 25, against predetermined null producing potentials derived in the appropriate balancing arms of the bridges. As would be normally expected in the operation of such bridge circuits, changes in the potentials between the electrode pairs would make available in the bridging leads thereof, current outputs which can be directed to power control devices such as the conventional A.-C. amplifiers $A_1$ and $A_2$ shown in FIG. 1. Characterizing the arrangement of bridge $B_1$ are the arm defined by leads 36 and 32, comprising the electrode pairs 21, 22 and 22, 23, two arms defined by leads 38, 39 and 40, having in circuit therewith capacitors 42 and 43, respectively, and the arm comprising lead 45 and a balancing electrode pair $C_1$. By means of the further leads 48 and 49, amplifier $A_1$ is connected across bridge $B_1$ at an appropriate point between leads 36 and 45, and at a point on an adjustable balancing resistor 50, constituting the juncture between the arms defined by leads 38 to 40. Bridge $B_2$ is similarly formed by an arm defined by leads 34 and 36, comprising electrode pairs 23, 24 and 24, 25, two arms defined by leads 58, 59 and 60, having in circuit therewith capacitors 62 and 63, respectively, and an arm defined by lead 65 comprising a balancing electrode pair $C_2$. Further leads 68 and 69 are provided to connect amplifier $A_2$ across bridge $B_2$ at a point between leads 36 and 65, and at a point on an adjustable balancing resistor 70, constituting the juncture between the arms defined by leads 58 to 60. Alternating current power for energizing the sensing and detecting circuitry hereabove described, is supplied by suitable power sources $S_1$ and $S_2$, connected in a conventional manner across the further junctions at which are connected the arms of bridges $B_1$ and $B_2$, respectively.

A registering system for the invention as disclosed herein is provided by a register control mechanism CS comprising a logic circuit employing relays $L_1$, $L_2$, $L_3$ and $L_4$, which function to ultimately complete operating circuits for the actuating relays of a pair of rapidly responsive indicating registers $R_1$ and $R_2$. As is evident from the showing in FIG. 1, current signals emanating from amplifiers $A_1$ and $A_2$ are introduced to the control mechanism CS on separate leads 75 and 76 in which are operative rectifier diodes D1 and D2, respectively. Basically, it is these signals which control the energization of the logic relays whereby their switch elements are displaced to complete operating circuits for the separate registers. However, these relays respond only to a predetermined sequence of such signals so as to obtain an accurate bi-directional control wherein the individual registers $R_1$ and $R_2$ are selectively activated in accordance with the particular direction in which a fish traversed the tunnel structure 11.

Register control mechanism CS is essentially the same as that disclosed by Van Haagen in the patent previously identified. A separate D.-C. source P is provided to energize relays $L_2$ and $L_4$, as well as the actuator relays of registers $R_1$ and $R_2$, when their energizing circuits are completed. On the other hand, relays $L_1$ and $L_3$ are directly energized by amplifiers $A_1$ and $A_2$, respectively, in circuits completed through the ground connections 71, 72, in the output circuits of the amplifiers. Relays $L_1$ and $L_3$ each have a single-pole, double-throw switch element displaceable between a normally closed contact $a$, and a normally open contact $b$, and a special switch element which momentarily closes a contact $c$ only upon a change in the energization state of the relay, such as when the relay is energized or deenergized. Relays $L_2$ and $L_4$, each have a single-pole, double-throw switch element displaceable between a normally closed contact $a$ and a normally open contact $b$, and a single-pole, single-throw switch element displaceable to close a normally open $c$ contact. Relays $L_1$ and $L_3$ also differ from their complementary relays $L_2$ and $L_4$, in that upon their energization, the former respond to displace their switch elements about three times faster than do the latter.

An energization circuit for relay $L_1$ is traceable on leads 71, 75, 77, 78 and 79, which provide a current path between amplifier $A_1$ and the relay. A similar circuit for relay $L_3$ is traceable on leads 72, 76, 80, 81, 82 and 79, which provide a current path between amplifier $A_2$ and relay $L_3$. Relay $L_2$ is energized when a current path is completed between it and power source P, on leads 83, 84, contact $L_{1b}$, lead 85, contacts $L_{4a}$, leads 86, 87, 88, 89, 81, 82 and 78. Relay $L_4$ is energized when a current path is completed between it and power source P on leads 83, 90, contact $L_{3b}$, lead 91, contact $L_{2a}$, leads 92, 93, 94, 82 and 78. The actuating relay of register R is energized when a current path is completed between it and power source P on leads 83, 90, contact $L_{3a}$, lead 95, contact $L_{4c}$, lead 96, contact $L_{1c}$, leads 97 and 78. The actuating relay of register $R_2$ is energized when a current path is completed between it and power source P on leads 83, 84, contact $L_{1a}$, lead 98, contact $L_{2c}$, lead 99, contact $L_{3c}$, leads 100, 101, 89, 81, 82 and 78.

As was previously indicated, amplifier $A_1$ produces an output in response to changes in the electrical conductivity between electrodes 21 and 22, or electrodes 22 and 23. It is evident that either or both such changes act to unbalance bridge $B_1$ whereby the current then caused to flow in the circuit of leads 48 and 49, activates the amplifier. A sensitive balance is attained initially for bridge $B_1$ by means of the conductive electrodes pair $C_1$ which when placed in the water at some distance from the tube member 12, provides in its bridge arm a load that is equivalent to that obtained in the arm loaded by the circuits made through undisturbed conductive paths between electrodes 21, 22 and 23. The loads in the arms comprising capacitors 42 and 43, respectively, are brought to a balance by means of the voltage division effect accomplished therein in an obvious manner by suitably positioning a contact slider on adjustable resistor 50. Bridge $B_2$ is initially conditioned to a sensitive balance in the same way, by means of its balancing conductive pair $C_2$ and its adjustable resistor 70. Consequently, bridge $B_2$ reacts to supply current to the circuit of leads 68, 69, and amplifier $A_2$, when the bridge detects a change in the electrical conductivity between pairs of electrodes, 23, 24 and 25.

With reference once more to tunnel structure 11 of FIG. 1, it can be seen that during its operation in the grounded conductive medium under water, the electrodes 21 and 22 thereof, cause to be effective a conductive path having relatively high resistance at or about electrode 21, and relatively low resistance at or about electrode 22. For example, the medium constituting the conductive path may be viewed as a uniform resistance element in a circuit completed between electrode 22 at the potential of course $S_1$, and electrode 21 at the ground potential of the medium. It is evident therefore that since electrode 21 is at the potential of the medium, resistances measured at points along the conductive path established by the medium, increasingly distant from electrode 22, accordingly increase. Consequently, a fish moving from left to right and passing into opening 16 of tunnel structure 11, whereby it enters only the hoop of electrode 21, produces little or no significant effect on bridge circuit $B_1$. Manifestly, the presence of the somewhat lower resistance of the fish body, which displaces a part of the higher resistance medium in the conductive path, at only the high resistance area about electrode 21, does not cause a sufficient change in the conductivity of the path as to disturb bridge $B_1$. However, as the fish traverses the path between the electrodes 21 and 22, and enters the hoop of electrode 22, the lower resistance fish body displaces medium all along the conductive path. As a result, the arm of bridge $B_1$ comprising these electrodes, measures increased currents in their conductive path. The subsequent unbalance in bridge $B_1$ allows current to flow in the circuit of amplifier $A_1$ which thereupon provides an output to lead 75.

Output current from amplifier $A_1$ flows in a circuit completed through leads 71, 75, 77, 78 and 79, whereby relay $L_1$ is activated to close contacts at $L_{1b}$, and momentarily close contacts at $L_{1c}$. Since the $L_{4c}$ contacts are then open, the momentary closure of $L_{1c}$ does not operate register $R_1$. However, a circuit to energize relay $L_2$ is completed to D.-C. power P, through contacts closed at $L_{1b}$, leads 83, 84, 85, normally closed contacts $L_{4a}$, and leads 86, 87, 88, 89, 81, 82 and 78. However, the resultant closure of the $L_2$ relay contacts at $L_{2b}$ and $L_{2c}$ are ineffectual since contacts at $L_{3b}$, and $L_{3c}$ in circuit therewith, remain open.

Further movement of the fish through tunnel structure 11, to enter the hoop of electrode 23, does not change the then existing state of the circuits since any further unbalance in the bridge arm comprising electrode pair 22 and 23, merely continues current output from amplifier $A_1$, and the energization of relays $L_1$ and $L_2$. Upon its passage into the hoop of electrode 24, the fish provides its lower resistance body to form the media establishing a conductive path between electrode pair 23 and 24, in addition to a conductive path between electrode pair 22 and 23. Consequently, bridges $B_1$ and $B_2$ are then both brought to an unbalance, causing their respective amplifiers $A_1$ and $A_2$ to each produce an output. As a result, relay $L_3$ is energized in a current path completed through leads 72, 76, 80, 81, 82, and 79, whereby $L_3$ closes its contacts at $L_{3b}$, and momentarily closes its contacts at $L_{3c}$. A holding circuit for relay $L_2$ is thus completed through to the D.-C. power source P, by means of the closed contacts $L_{3b}$ leads 83, 90, 91, closed contacts $L_{2b}$, and leads 87, 88, 89, 81, 82 and 78. The contacts closed at $L_{3c}$ do not operate register $R_2$ since contacts $L_{4c}$ remain open.

Moving further to the right, the fish enters the hoop of electrode 25, and leaves the immediate vicinity of electrodes 21 and 22. The action following this move, includes the deenergization of relay $L_1$ since bridge $B_1$ is no longer held unbalanced, and the output from amplifier $A_1$ has ceased. Consequently, the contacts at $L_{1b}$ open, and those at $L_{1a}$ close. Although contacts $L_{1c}$ momentarily close on deenergization of relay $L_1$, there is no effect on register $R_1$ since contacts at $L_{4c}$ remain open. Relay $L_2$ remains energized through its holding circuit. Passage of the fish out of electrode 24 does not effect the unbalance state of bridge $B_2$, and amplifier $A_2$ continues to furnish its output to the circuits of the register system. Thereafter, when the fish leaves the tunnel structure by passing out of the hoop of electrode 25, balance is restored to brdge $B_2$, and output from amplifier $A_2$ also ceases. Relay $L_3$ is thereupon deenergized to switch its contact arm away from $L_{3b}$ and back to $L_{3a}$. Moreover, the contacts at $L_{3c}$ momentarily close to complete an energizing circuit from D.-C. power P to the actuating relay of register $R_2$, through leads 83, 84, normally closed contacts at $L_{1a}$, lead 98, closed contacts $L_{2c}$, leads 99, 100, 101, 89, 81, 82 and 78. This circuit to register $R_2$ is completed even though the holding circuit for relay $L_2$ is opened at contacts $L_{3b}$ when relay $L_3$ is deenergized. It should be recalled that relay $L_2$ is relatively slow acting in comparison to the responsiveness of relay $L_3$, with the result that in spite of the open circuit to relay $L_2$, this relay does not act to switch its contact arm at $L_{2c}$ until after the contacts at $L_{3c}$ have momentarily closed to complete the power circuit which operates the actuator solenoid in the register.

From the foregoing, it should be clear that each fish passing from left to right through the tunnel structure 11, adds a count to register $R_2$. Because of the basic symmetry of the various detector, control, and register operating circuits constituting the arrangement of FIG. 1, it should be equally clear that each fish passing from right to left through the tunnel structure would cause an operational sequence analogous to that above described, and add a count to register $R_1$. It should also be apparent that in no event would a count be added to either register unless the fish had effectively traversed the full length of the tunnel structure. If any substantial portion of the fish body resides between electrodes 21 and 22, or electrodes 24 and 25, the bridge circuit corresponding to the affected electrode pair remains unbalanced to provide current to energize relays $L_3$ or $L_1$, as the case may be, whereby the registers are maintained inoperative. Any fish having a terminal part thereof substantially in or beyond the hoop of electrodes 21 or 25, can be considered to have traversed the tunnel structure since the fish is effectively compelled by the quite restrictive openings 16 or 17 of the tubular member 12, to continue in a path outside this structure.

A tunnel structure 111, in FIG. 2a, characterized by an arrangment of three electrodes 112, 113 and 114, represents as was hereinbefore indicated, prior art. Bridge circuits in the nature of that shown in FIG. 1, are operatively associated with this tunnel structure by means of leads 132, 133 and 134. Electrode 112 and 114 are in separate circuits, completed through leads 132 and 134, which directly connect these electrodes to the respective power supplies of the bridges, and electrode 113, in a circuit including lead 133, is joined to both bridge circuits by connections corresponding to those shown in FIG. 1 associating common return lead 36 with bridge circuit $B_1$ and $B_2$. During operation of tunnel structure 111, central electrode 113 coacts with both electrodes 112 and 114 to constitute electrode pairs 112, 113 and 114, 113. As was hereinbefore explained, the resistance of the conductive path between paired electrodes varies from a maximum at the return electrode to a minimum at the electrode circuited directly to the power source in the bridge circuit. Accordingly, the resistance between electrodes 112 and 113, and between electrodes 114 and 113, diminishes approaching electrodes 112 and 114, respectively. Consequently voltage measurements taken between the common electrode 113, and various points in conductive paths approaching electrodes 112 and 114, manifest gradually increasing voltages, with the maximum voltages being measureable at points in the immediate vicinity of electrodes 112 and 114.

The graphical lines shown in FIG. 2a, represent cross sections of equipotential surfaces between the paired electrodes. The scale or from 100 to 0, applied in FIG. 2a to identify the lines, is indicative of the existing voltage gradients varying from maximum to minimum between the respective electrodes 112 and 114, and common electrode 113. Furthermore, since the medium in which the tunnel structure is installed, is conductive and at the potential of electrode 113, significant voltage gradients are seen in FIG. 2a, to exist between the respective electrodes 112 and 114, and points in the medium at substantial distances outside and around the openings in tunnel structure 11. This spread of conductive paths outside the tunnel structure is ordinarily a source of serious difficulties to a proper operation of a fish counting apparatus. Events that have little to do with the passage of fish through the tube such as the conductivity of structural objects in the vicinity, the movement of fish in the vicinity, the proximity of the water surface, and the nature of the bottom materials cause erroneous counter operation. These factors also contribute to the instability of the counting system which is manifested by a "drift" in the null or balance of the bridge circuits. Attempts to overcome the difficulties inherent it the use of a three element tunnel structure such as shown in FIG. 2a, often required all adjacent metal structures to be insulated, and the installation of extra structures outside the tunnel structure at such points where fish might swim near the exterior of the structure.

FIG. 2b illustrates by its graphical lines the voltage gradient contours characterizing electrical phenomena in and around the tunnel structure of the present invention. Because the outer or end electrodes of this tunnel structure are at the return potential, or that of the medium, the existing voltage gradients to points outside the tunnel structure are quite inconsequential. Therefore, tunnel structures according to this construction are found to have practically all of their points of effective voltage in conductive paths confined within the non-conductive tubular members comprising these structures. In addition, there is a more linear distribution of the voltage gradients within such tunnel structure. The structure is practically free from the effects of random changes outside its tubular member, including surface wave action close to the top of the structure. There is also an increased stability and sensitivity in its detector circuits which result in less critical and less frequent adjustments of such circuits, permitting semiskilled helpers to use this type of counting apparatus in the field.

Since significant outputs from either detector circuit shown in FIG. 1 occurs in response to a change in the conductivity of substances passing through the tunnel structure, it can be readily understood that the present invention is easily adaptable for detecting and measuring the conductivity characteristics of such substances. Moreover, since one detector circuit need be used in an operation of the invention for this purpose, circuitry also pertaining thereto includes two conductive leads from the tunnel's first or last three electrodes to two opposite junctions of the appropriate detector circuit, and conductive leads from the other two opposite junctions of the detector circuit connected to a conductivity indicator such as a galvanometer. Proper components are selected for use in the bridge arms of the detector circuit to determine a base or index value of conductivity, and the galvanometer is accordingly calibrated therefrom in a conventional manner. With the tunnel structure located in the flow path of a stream, or periodically placed therein in a predetermined sequence, observations of the calibrated galvanometer can be taken at appropriate times to obtain readings representing conductivity or salinity data. The representative signals in the galvanometer circuit can obviously also be directed to an amplifier operating a recorder, or accomplish other similar control functions.

While particular embodiments of the present invention have been illustrated and described herein, it will be understood that this invention is not limited thereto, but is susceptible to change in form and detail.

What is claimed is:

1. In an electrical apparatus for measuring a representative characteristic of a conductive substance moving in a confined space, a detecting circuit, and a sensing means comprising a non-conductive conduit device having openings at its opposite ends between which is defined said confined space, a plurality of electrically conductive ribbons spacially arranged on non-contiguous areas on the inner surface of said conduit device, a plurality of electrical conductors providing electrical connections between said conductive ribbons and said detecting circuit wherein at least two of said electrical conductors are joined to establish a common conductive path in which electrical current from at least two of said conductive ribbons flows directly to said detecting device, and another of said electrical conductors provides a singular path in which electrical current from another of said plurality of conductive ribbons flows directly to said detecting circuit.

2. In an electrical apparatus for detecting and registering the passage of discrete masses through a conductive medium in a confined area, having register operating control circuits, a sensing means comprising a non-conductive shell having opposite end openings and defining therein the said confined area, and at least five conductive elements spacially arranged in said shell and operable when energized to establish current flow in a plurality of conductive paths through said conductive medium, a pair of detecting circuits each of which is electrically connected to at least two adjacent ones of said conductive elements and said register operating control circuits, said detector circuits being responsive to the passage of a discrete mass into an opposite end opening of said shell and along said conductive paths having current therein, to produce signals which activate the register operating control circuits.

3. In the apparatus of claim 2, each of the detecting circuits comprising an impedance bridge in which a source of power and an amplifier are respectively connected across different opposite junctions joining the arms of said bridge, and at least one pair of said adjacent conductive elements being in a circuit constituting one of said bridge arms.

4. In the apparatus of claim 2, each of the detecting circuits comprising an impedance bridge in which a source of power and an amplifier are respectively connected across the different opposite junctions joining the arms of said bridge, and at least three of said conductive elements in said shell being in a circuit constituting one of said bridge arms, whereby one of said three conductive elements adjacent to the other two, is conductively joined to a junction of said bridge connecting the said power source thereto, and the said other two conductive elements are joined to a junction of said bridge connecting the same amplifier thereto.

References Cited by the Examiner

UNITED STATES PATENTS 2,893,633    7/1959    Van Haagen _____ 235—98
3,040,980    6/1962    Mann et al. _____ 235—98

MALCOLM A. MORRISON, *Primary Examiner.*